United States Patent [19]

Kermisch

[11] Patent Number: 5,598,181

[45] Date of Patent: Jan. 28, 1997

[54] METHOD AND APPARATUS FOR ROTATING A DIGITAL IMAGE NINETY DEGREES USING A SMALL AUXILIARY BUFFER

[75] Inventor: Dorian Kermisch, Penfield, N.Y.

[73] Assignee: Xerox Corporation, Stamford, Conn.

[21] Appl. No.: 312,366

[22] Filed: Sep. 26, 1994

[51] Int. Cl.$^6$ ........................................... G09G 5/00
[52] U.S. Cl. .......................... 345/126; 382/297; 345/201
[58] Field of Search ..................... 345/121–126, 345/185, 202, 201; 395/164, 165, 166

[56] References Cited

U.S. PATENT DOCUMENTS

| | | | |
|---|---|---|---|
| 4,894,646 | 1/1990 | Ryman | 345/126 |
| 4,916,746 | 4/1990 | Yeschick | 345/126 |
| 4,929,085 | 5/1990 | Kajihara | 345/126 |
| 4,995,089 | 2/1991 | Altrieth, III | 345/126 |
| 5,034,733 | 7/1991 | Okazawa et al. | 345/126 |
| 5,133,025 | 7/1992 | Koyama et al. | 345/126 |

OTHER PUBLICATIONS

"A Problem in Abelian Groups with Application to the Transposition of a Matrix on an Electronic Computer", Article written by Gordon Pall and Esther Seiden in Math Comp. 14 (1960), pp. 189–192.

*Primary Examiner*—Richard Hjerpe
*Assistant Examiner*—Lun-Yi Lao

[57] ABSTRACT

A method for rotating an image clockwise or counter clockwise by ninety degrees in place in an image buffer with a small auxiliary buffer is disclosed. The image, defined by a rectangular pattern of H lines with each line having W pixels, is segmented into square blocks of N pixels per row and N lines per column. The image is stored in an image buffer, and each square block of pixels in the image buffer is rotated by ninety degrees. A starting memory location in the image buffer is selected from a set of starting memory locations, and a memory word at the selected starting memory location is copied into a memory word of a temporary storage buffer. A replacement memory location in the image buffer is determined for the memory word in the temporary storage buffer, which is swapped with a memory word at the replacement memory location. A sequence of replacement memory locations is defined by repeating the preceding operation until the selected starting memory location in the image buffer is determined to be a replacement memory location in the image buffer for the memory word in the temporary storage buffer. The sequence of replacement memory locations is terminated by replacing the memory word at the selected starting memory location with the memory word in the temporary storage buffer.

13 Claims, 7 Drawing Sheets

| 36 | 24 | 12 | 00 | 10 | 28 | 16 | 04 | 44 | 32 | 20 | 08 |
|----|----|----|----|----|----|----|----|----|----|----|----|
| 37 | 25 | 13 | 01 | 11 | 29 | 17 | 05 | 45 | 33 | 21 | 09 |
| 38 | 26 | 14 | 02 | 12 | 30 | 18 | 06 | 46 | 34 | 22 | 10 |
| 39 | 27 | 15 | 03 | 43 | 31 | 19 | 07 | 47 | 35 | 23 | 11 |
| 84 | 72 | 60 | 48 | 88 | 76 | 64 | 52 | 92 | 80 | 68 | 56 |
| 85 | 73 | 61 | 49 | 89 | 77 | 65 | 53 | 93 | 81 | 69 | 57 |
| 86 | 74 | 62 | 50 | 90 | 78 | 66 | 54 | 94 | 82 | 70 | 58 |
| 87 | 75 | 63 | 51 | 91 | 79 | 67 | 55 | 95 | 83 | 71 | 59 |

| 84 | 72 | 60 | 48 | 36 | 24 | 12 | 00 |
|----|----|----|----|----|----|----|----|
| 85 | 73 | 61 | 49 | 37 | 25 | 13 | 01 |
| 86 | 74 | 62 | 50 | 38 | 26 | 14 | 02 |
| 87 | 75 | 63 | 51 | 39 | 27 | 15 | 03 |
| 88 | 76 | 64 | 52 | 40 | 28 | 16 | 04 |
| 89 | 77 | 65 | 53 | 41 | 29 | 17 | 05 |
| 90 | 78 | 66 | 54 | 42 | 30 | 18 | 06 |
| 91 | 79 | 67 | 55 | 43 | 31 | 19 | 07 |
| 92 | 80 | 68 | 56 | 44 | 32 | 20 | 08 |
| 93 | 81 | 69 | 57 | 45 | 33 | 21 | 09 |
| 94 | 82 | 70 | 58 | 46 | 34 | 22 | 10 |
| 95 | 83 | 71 | 59 | 47 | 35 | 23 | 11 |

FIG. 11

| | |
|---|---|
| (00) | (01) |
| (02) | (03) |
| (04) | (05) |
| (06) | (07) |
| (08) | (09) |
| (10) | (11) |
| (12) | (13) |
| (14) | (15) |
| (16) | (17) |
| (18) | (19) |
| (20) | (21) |
| (22) | (23) |

FIG. 12

METHOD AND APPARATUS FOR ROTATING A DIGITAL IMAGE NINETY DEGREES USING A SMALL AUXILIARY BUFFER

The present invention relates to a method and apparatus for rotating a digital image ninety degrees, and in particular to an efficient method for rotating a digital image by ninety degrees in place in an image buffer with a small auxiliary buffer.

BACKGROUND OF THE INVENTION

Image processing systems typically include an input device such as a scanner and a computer system that is equipped with document applications for storing and editing scanned electronic documents and an output device such as a printing system for rendering documents. The computer system is operated by a user to edit or view scanned "softcopy" digital images on a monitor of the computer system. The user can subsequently generate "hardcopy" reproductions of the softcopy images by instructing the computer system to provide the processed electronic image to a selected printing device. Advances in printing technology together with advances in computer system technology are helping image processing systems become more pervasive in desk-top publishing and business applications. Ink jet, thermal-transfer and xerographic color are examples of printing technologies that are making moderate resolution affordable.

Electronic images or "softcopy" images processed by desk-top publishing applications consist of two dimensional arrays of picture elements (pixels) or image signals. Historically small computer memories requires the use of intermediate disk buffers to rotate an electronic image of reasonable size. However, with the availability of larger computer memories, desk-top publishing applications can store entire electronic images in real memory. Even with large real memory allocations, there is not always sufficient memory to store both an original image and a rotated image. In some systems for example, available computer memory is large enough to contain one electronic image but not large enough to contain both an original image and a rotated image. In such instances rotating an electronic image in place, that is, within its own buffer and without the use of significant intermediate memory or auxiliary memory is desirable. Rotating an image in place for any arbitrary rotation however is not always possible since the image memory allocation of a rotated image can be larger than the memory allocation of an original image. Ninety degrees rotation of an original image, however, results in a rotated image having equal memory allocation as the original image.

To rotate an electronic image in place, requires that sequences of replacement operations are performed to an electronic image that is stored in an image buffer. Each replacement operation of a sequence must be performed so that each replacement operation does not erase pixels in the image buffer not already transferred. An analytical solution to the problem of finding the starting locations of the replacement sequences for ninety degree rotations, pixel by pixel, is given by Pall et al. in "A Problem in Abelian Groups with Application to the Transposition of a Matrix on an Electronic Computer", Math. Comp. 14 (1960), 189–192.

SUMMARY OF THE INVENTION

In accordance with the invention, there is provided a method for rotating an image defined by a rectangular pattern of H lines with each line having W pixels. The method includes the steps of segmenting the image into square blocks of N pixels per row and N lines per column, each row of pixels being contained in one ore more memory words of an image buffer; individually rotating each square block of pixels in the image buffer by 90 degrees; selecting a starting memory location in the image buffer; copying a memory word at the starting memory location into a memory word of a temporary storage buffer; determining a replacement memory location in the image buffer for the memory word in the temporary storage buffer; swapping the memory word in the temporary storage buffer with a memory word at the replacement memory location; repeating the steps of determining and swapping until the starting memory location in the image buffer is determined to be a replacement memory location in the image buffer for the memory word in the temporary storage buffer; and replacing the memory word at the starting memory location with the memory word in the temporary storage buffer, to terminate said repeating step.

In accordance with another aspect of the invention, there is provided an apparatus for rotating an image defined by a rectangular pattern of H lines with each line having W pixels. Means segment the image into square blocks of N pixels per row and N lines per column. The segmenting means stores each row of pixels in a memory word of an image buffer. Means individually rotate each square block of pixels in the image buffer through a selected angle. Means select a starting memory location in the image buffer. Means copy a memory word at the starting memory location into a memory word of an auxiliary storage buffer. A processor determines a replacement memory location in the image buffer for the memory word in the auxiliary storage buffer. Means swap the memory word in the auxiliary storage buffer with a memory word at the replacement memory location. Means define a sequence of replacement memory locations with the processor and the swapping means that terminates in response to the starting memory location in the image buffer being determined to be a replacement memory location in the image buffer for the memory word in the auxiliary storage buffer. Means replace the memory word at the starting memory location with the memory word in the auxiliary storage buffer to terminate the sequence of replacement memory locations.

BRIEF DESCRIPTION OF THE DRAWINGS

These and other aspects of the invention will become apparent from the following descriptions to illustrate a preferred embodiment of the invention read in conjunction with the accompanying drawings wherein the same reference numerals have been applied to like parts and in which.

DETAILED DESCRIPTION

Figure 1:
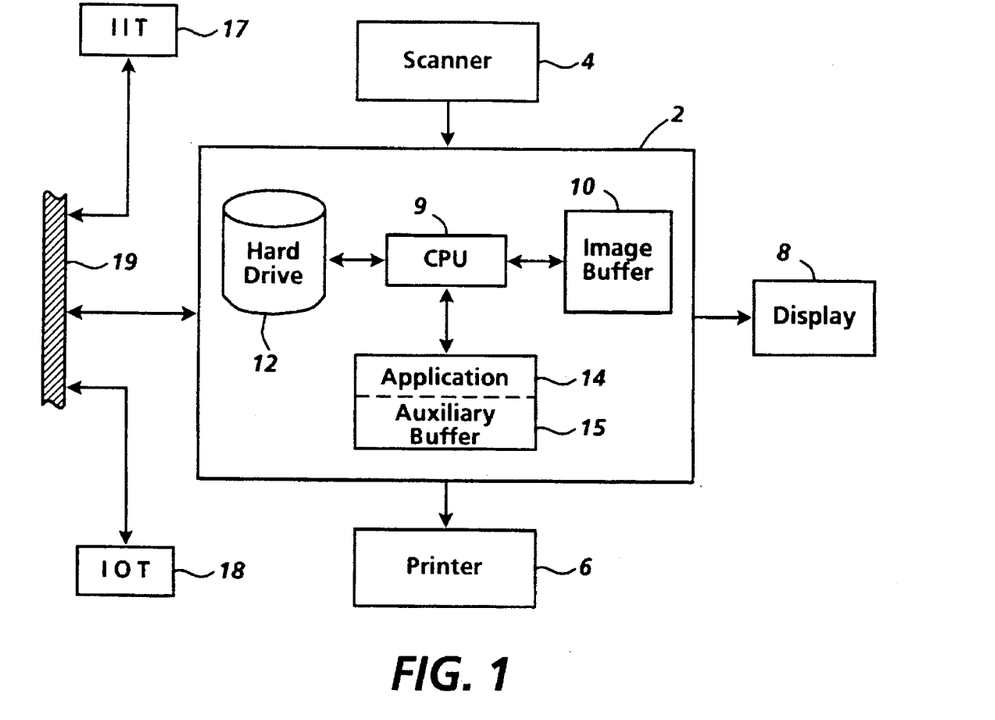
FIG. 1 is a block diagram of an basic system for carrying out the present invention.

Referring now to the drawings where the showings are for the purpose of describing the preferred embodiment of the invention and not for limiting same. With reference to FIG. 1, there is shown a general block diagram of image processing system 2 for carrying out the present invention. The image processing system 2 has connected thereto image input terminal (IIT) or scanner 4 that converts hardcopy images into a digital image signals which can be reproduced on image output terminal (IOT) or printer 6. A digital image received from scanner 4 by image processing system 2 is stored in image buffer 10 before transfer to long term storage such as disk drive 12. Once a digital image is stored in image buffer or display buffer 10, the image can be viewed on display 8 connected to image processing system 2. The central processing (CPU) 9 of the image processing system 2 executes image processing application 14 to rotate the digital image stored in image buffer 10 by ninety degrees. The resulting rotated image in image buffer 10 can be viewed on display 8 or rendered on hardcopy by printer 6. Additionally, image processing system 2 can receive an image for rotation from image input terminal 17 and can transmit rotated images to image output terminals 18 connected to network 19, examples of IIT 17 and IOT 18 include a workstation, a facsimile server, a print server and a file server.

Generally, digital image signals or pixels representing a hardcopy image transmitted from scanner 4 have a resolution and pixel density which are stored in image buffer 10. The digital image signals can represent color or black and white images, and can have a large number of density levels that are recorded in a gray level format. A digital image signal or pixel can have 256 gray levels, for a black and white image, and more than 16 million ($256^3$) gray levels, for a color image. The term "gray level" is used herein to described data for both black and white and color images. In its simplest form, a digital image can be represented using image signals having one gray level (i.e. a binary image), where each image signal is either black or white in the case of a black and white image.

Figure 2:
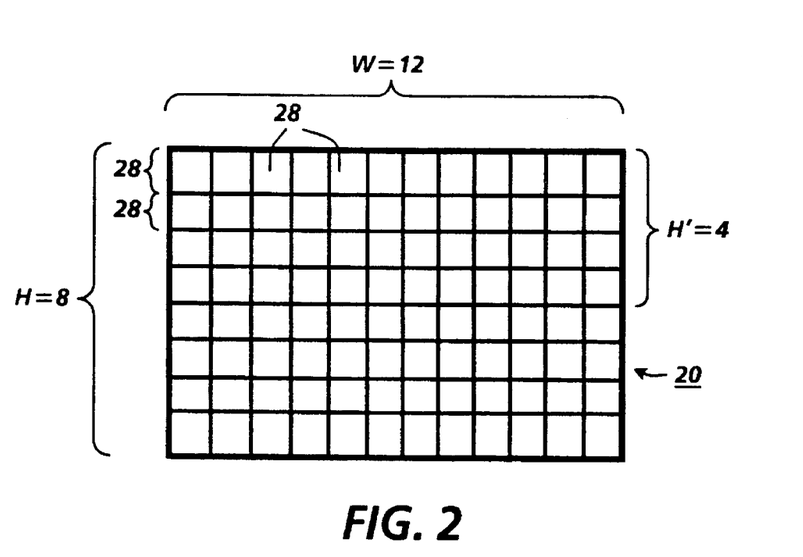
FIG. 2 is an illustration of an electronic image received by the system shown in FIG. 1.
Figure 3:
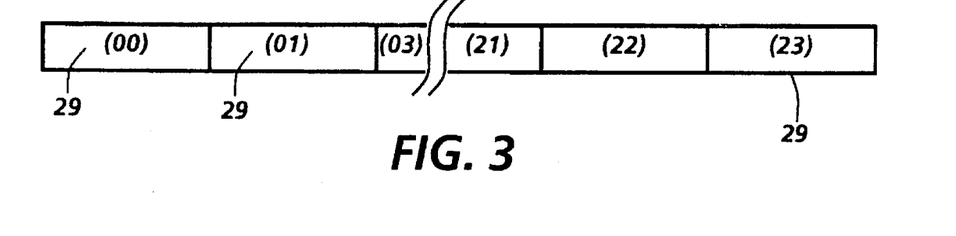
FIG. 3 shows the image buffer in FIG. 1 in detail as a sequence of memory words.
Figure 4:
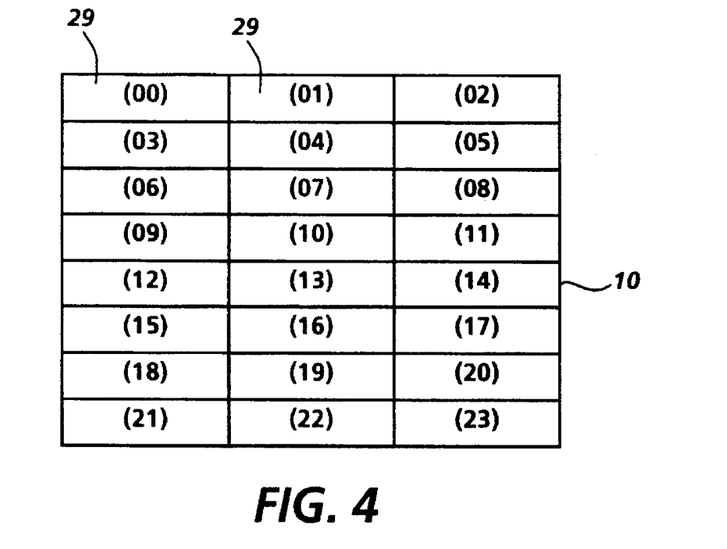
FIG. 4 is the image buffer shown in FIG. 3 diagrammatically representing a matrix of memory words with each memory word having a memory location labeled thereon.
Figure 5:
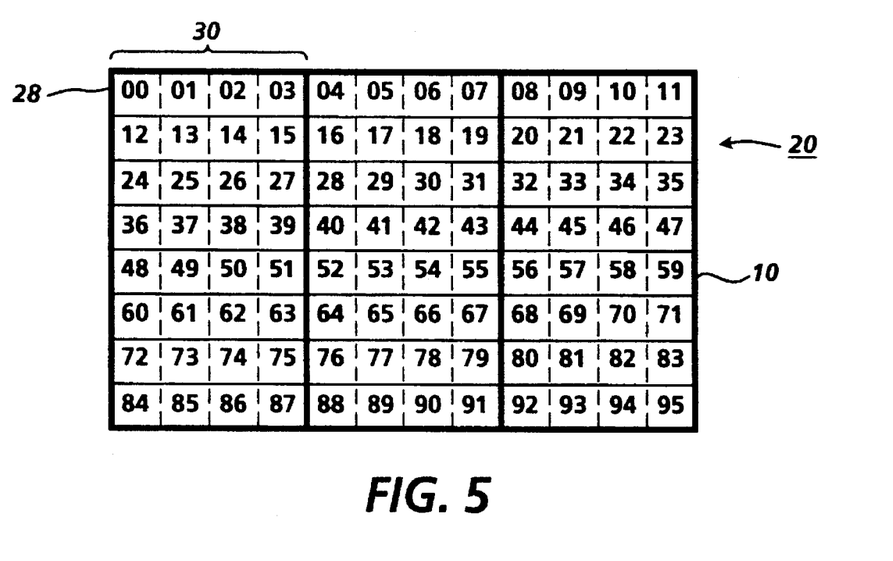
FIG. 5 is the image buffer shown in FIG. 4 storing the image illustrated in FIG. 2.

With reference to the present invention, FIG. 2 shows a digital image 20 which is transmitted from scanner 4, hard drive 12 or image input terminal 17 on network 19 to CPU 9 of image processing system 2. The digital image 20 shown in FIG. 2 is made up of H scanlines 27 with each scanline having W pixels 28. CPU 9 receives digital image 20 and stores each pixel in image buffer 10, which is a sequence of twenty four memory words, with four pixels per word, having memory locations 29 in image buffer 10 labeled from zero (00) to twenty three (23) as shown in FIG. 3. Alternatively, the sequence of memory words shown in FIG. 3 can be diagrammatically represented as a matrix of memory words as shown in FIG. 4, with each memory word having a memory location 29 labeled thereon. The CPU 9 of image processing system 2 stores each pixel of digital image 20 as a sequence of ninety six pixels numbered from zero to ninety five successively in the sequence of memory words of image buffer 10 as shown in FIG. 4. Thus, image buffer 10 can store 4 pixels of digital image 20 in each memory word as shown in FIG. 5.

After storing digital image 20 in image buffer 10, CPU 9 executes application 14 to rotate digital image 10 by ninety degrees in accordance with the invention. The flow diagram shown in FIG. 6 lists the sequence of steps required to rotate digital image 10 by ninety degrees in a clockwise or in a counter clockwise direction. At step 60, a set of starting memory locations $s_0$ is determined for digital image 20 stored in image buffer 10, the details of which are discussed later. At step 62, digital image 20 is divided into N×N blocks of pixels, with N pixels per row and N scanlines lines per column. The number of bits represented by the N pixels is equal to, or a multiple of, the natural integer size of the host machine. For example, image buffer 10 which stores digital image 20 could be divided into blocks with N equal to four pixels or one memory word as shown diagrammatically in FIG. 7. For the following discussion, we define the size of a memory word to be N pixels.

After dividing the image into blocks at step 62, each segmented N×N block is rotated by ninety degrees clockwise or counter clockwise at step 64. The decision as to whether to rotate digital image 20 clockwise or counter clockwise is determined by sampling a system variable which is initialized before application 14 is executed by CPU 9. Rotating each segmented N×N block is a bitwise operation for each memory word in image buffer 10 since four pixels are stored in one memory word of digital image 20.

Figure 8:
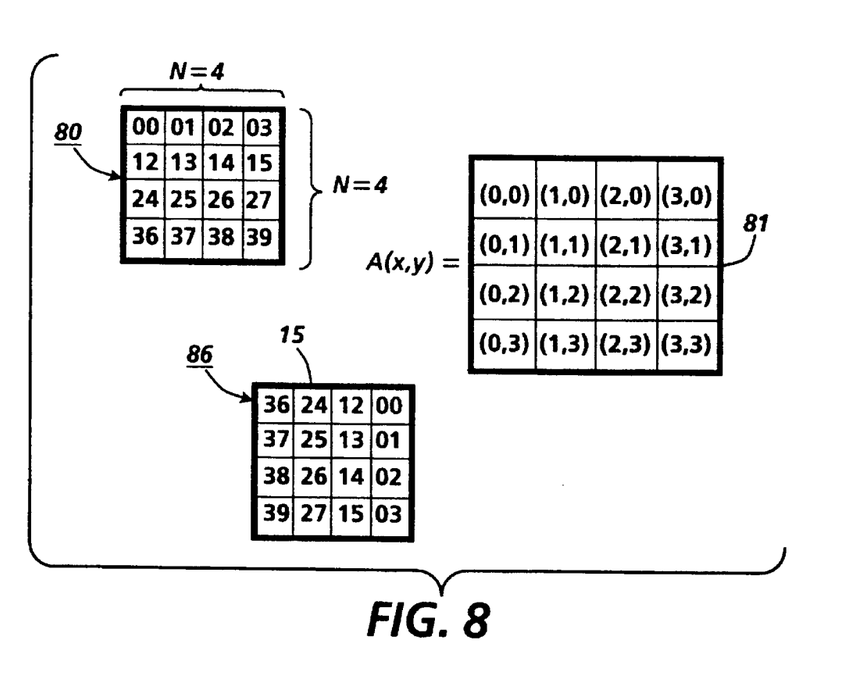
FIG. 8 is an illustrative example of one N×N block of the image shown in FIG. 7 being rotated clockwise by ninety degrees.

Referring now to FIG. 8 which shows a detailed example of a method for rotating N×N block of pixels 80 which is transferred to auxiliary buffer 15. To rotate the N×N block of pixels 80, it is represented by a two dimensional array of pixels 81 A(x,y), which has starting pixel A(0,0) with N equal to four pixels in each direction. To perform a clockwise (CW) rotation, each array element is transferred to auxiliary memory 15 according to the following sequence of pixel replacement operations before returning to starting pixel A(x,y), where "a→b" signifies that pixel b is replaced by pixel a:

A(x,y)→A(N−1−y, x)→A(N−1−x, N−1−y)→A(y,N−1−x)→A(x,y).

For example to rotate the N×N block of pixels 80 shown in FIG. 8, the following four sequences of pixel replacement operations are performed, to provide rotated N×N block of pixels 86:

A(0,0)→A(3,0)→A(3,3)→A(0,3)→A(0,0);

A(1,0)→A(3,1)→A(2,3)→A(0,2)→A(1,0);

A(0,1)→A(2,0)→A(3,2)→A(1,3)→A(0,1);

and

A(1,1)→A(2,1)→A(2,2)→A(1,2)→A(1,1).

Alternatively when a counter clockwise (CCW) rotation is selected, the direction of the sequence of pixel replacement operations is reversed as follows:

$$A(x,y) \rightarrow A(y,N-1-x) \rightarrow A(N-1-x, N-1-y) \rightarrow A(N-1-y, x) \rightarrow A(x,y).$$

In ether case, before the start of each sequence of pixel replacement operations, a pixel $A(N-1-y, x)$ or $A(y,N-1-x)$ must be saved in the auxiliary buffer 15, to have it available to replace pixel $A(x,y)$ at the end of the sequence. To determine a set of starting pixels analytically divide the matrix $A(x,y)$ into sets of concentric squares, where the left upper corners of each concentric square are pixels $A(n,n)$, with $n=0,1, \ldots ,N/2$. The pixels on one side of each concentric square from $(n,n)$ to $(n,N-2-n)$ then define the set of starting pixels.

Figure 9:
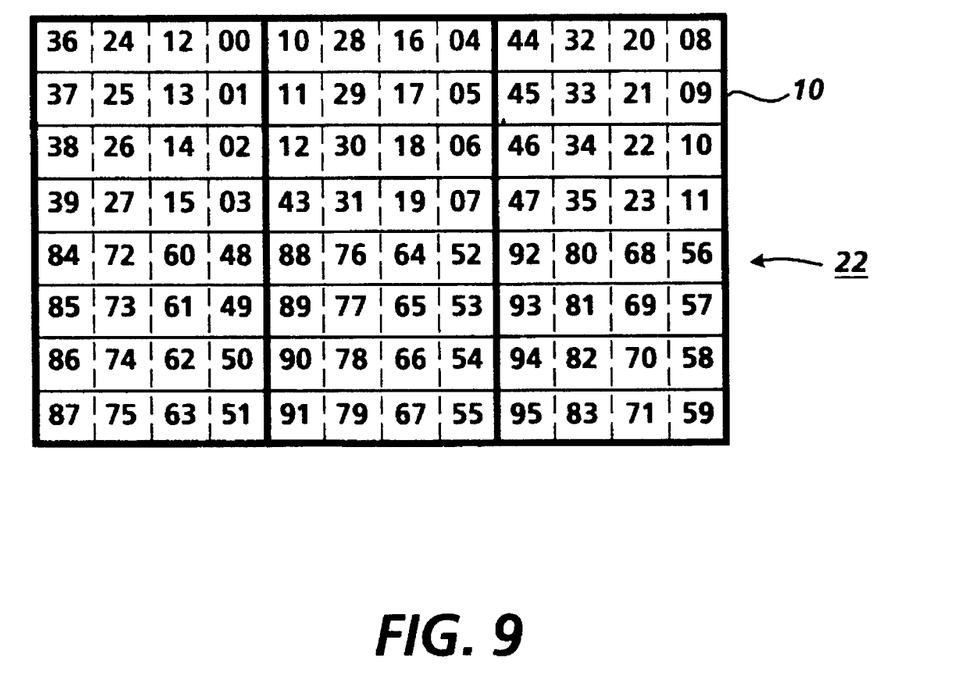
FIG. 9 shows the image in the data buffer shown in FIG. 7 with each N×N block rotated clockwise by ninety degrees.

Upon completing step 64 which requires that each N×N block of pixels segmented at step 62 be rotated by ninety degrees, digital image 20 is converted to digital image 22 stored in image buffer 10 as shown in FIG. 9. In accordance with one aspect of the invention, each row of pixels of digital image 22 is a multiple of a memory word in image buffer 10. At steps 66–78 each memory word (or sequence of memory words) storing each row of pixel of digital image 22 in image buffer 10 are repositioned to complete the rotation of digital image 20 by ninety degrees.

Figure 6:
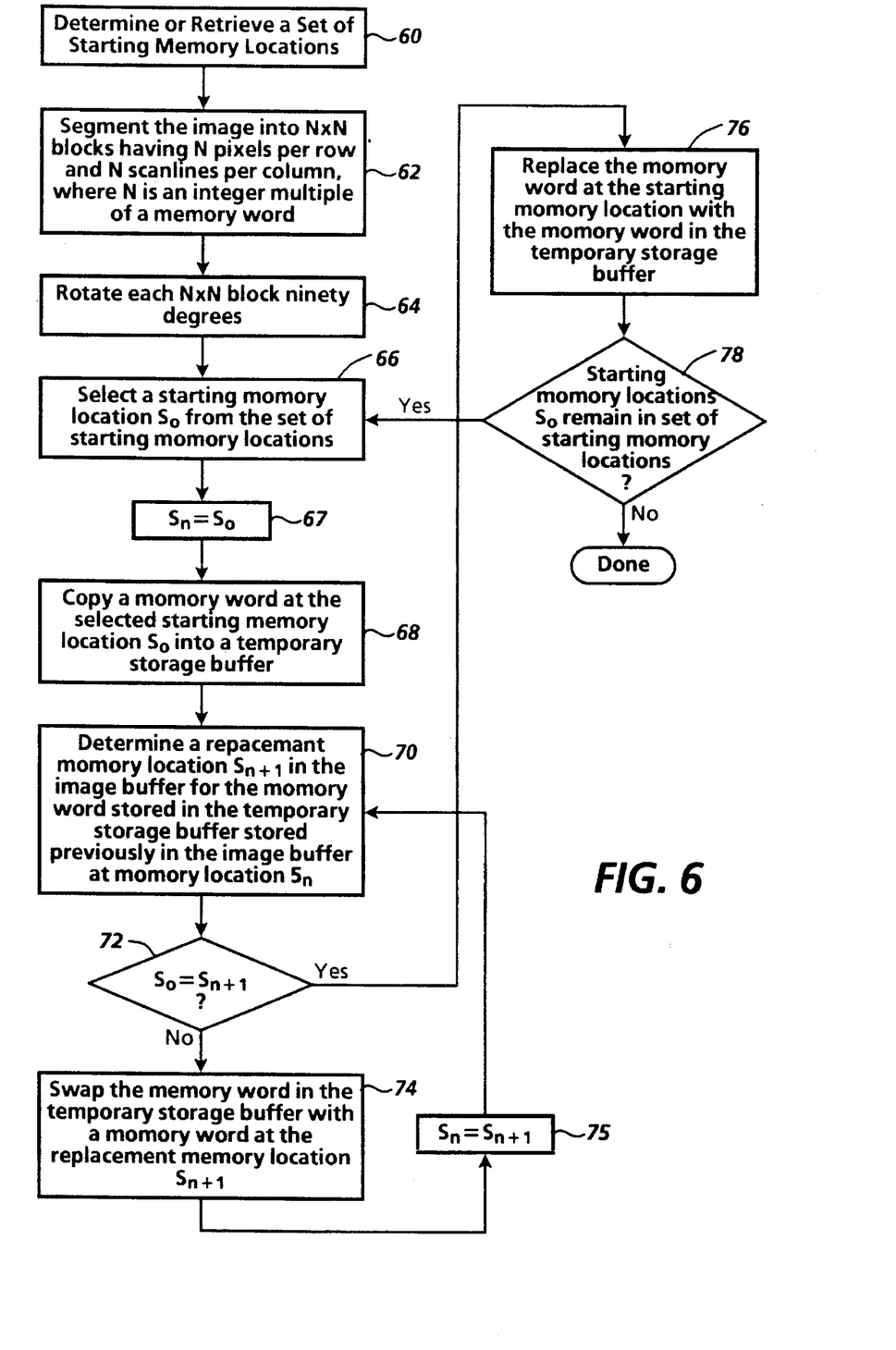
FIG. 6 is a flow diagram of the steps for rotating an image ninety degrees in place in an image buffer with a small auxiliary buffer.
Figure 7:
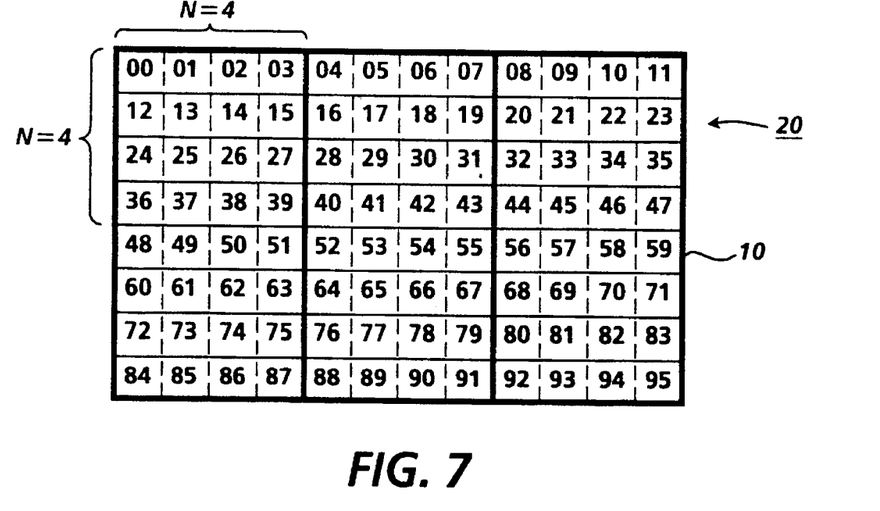
FIG. 7 illustrates one manner in which the image stored in the data buffer shown in FIG. 5 can be divided into N×N blocks.

At step 66, a starting memory location $s_0=00$ is selected from the set of starting memory locations determined at step 60. At step 67, starting memory location is set equal to a selected memory location $s_n$. The memory word at the selected memory location $s_n$ is copied into temporary storage buffer or auxiliary buffer 15 at step 68. At step 70, a replacement memory location $s_{n+1}$ is determined for the memory word stored in temporary storage buffer 15 using the following equations:

$$s_{n+1}=(xN+t)h+h-1-y, \text{ for CW rotation} \quad [1]$$

and $$s_{n+1}=((w-1-x)N+t)h+y, \text{ for CCW rotation} \quad [2]$$

where,
$h=H/N$;
$w=W/N$;
$x=s_n \text{MOD}_w$;
$yy=s_n/w$;
$y=yy/N$; and
$t=yy \text{ MOD } N$.

In this document, "/" denotes the integer division, "MOD" signifies the modulo operaton and H and W are assumed to be multiples of N. Using equation [1], the replacement memory location $s_{n+1}=01$ for memory memory location $s_n=s_0=00$ can be determined.

Figure 10:
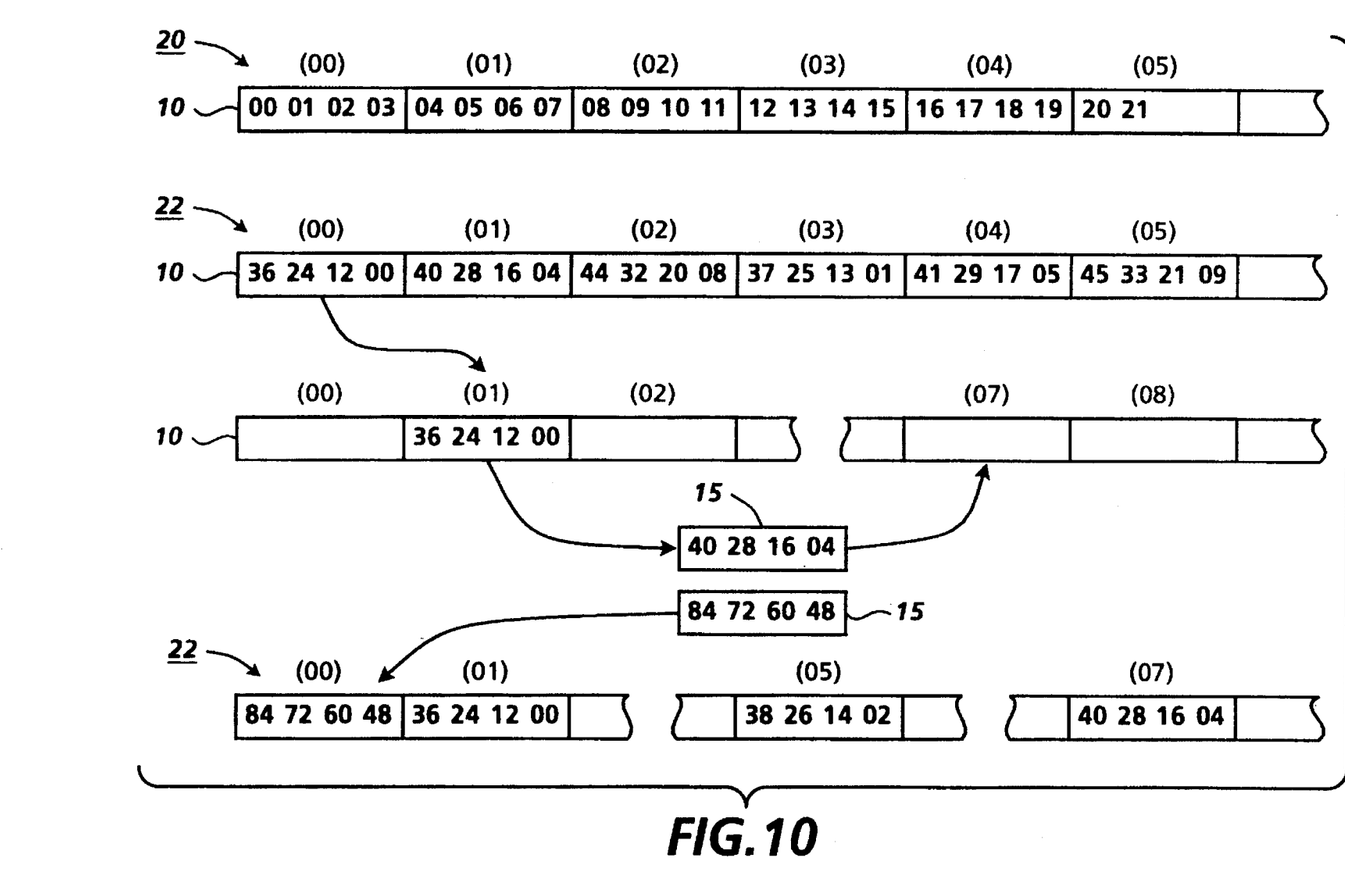
FIG. 10 is an example of sequences of replacement operations that are performed in accordance with the present invention to rotate an image ninety degrees with a small auxiliary buffer.

At step 72, the replacement memory location $s_{n+1}$ is compared with the starting memory location $s_0$ to determine if they are equal. If the replacement memory location does not equal the starting memory location (i.e. $s_0 \neq s_{n+1}$), then the memory word in the temporary storage buffer is swapped, at step 74, with a memory word at the replacement memory location in the image buffer 10 as shown by arrows 92 and 93 in FIG. 10. At step 75, the selected memory location $s_n$ is set equal to the replacement memory location $s_{n+1}$ and step 70 is repeated. However, if at step 72 the replacement memory location $s_{n+1}$ equals the starting memory location $s_0$ (i.e. $s_0=s_{n+1}$) then the memory word at the selected memory location $s_n$ is replaced with the contents of the temporary storage buffer 15, at step 76, as shown by arrow 95 in FIG. 10. Thus, at step 78 the following sequence of replacement memory locations for the memory words forming image buffer 10 has been defined:

$$[00] \rightarrow [01] \rightarrow [09] \rightarrow [07] \rightarrow [13] \rightarrow [08] \rightarrow [21] \rightarrow [06] \rightarrow [05] \rightarrow [19] \rightarrow [12] \rightarrow [00].$$

At step 78, if a starting memory location $s_0$ has not been selected from the set of starting memory locations determined at step 60, then a subsequent starting location $s_0$ is selected from the set of starting memory locations at step 66.

One method of determining a subsequent starting memory location is to select a memory location in image buffer 10 that has not already been defined in a sequence of replacement memory operations. For example, if a starting memory location $s_0=00$ is initially selected and a sequence of replacement memory locations is found as defined above, then a subsequent memory location not defined in the sequence of replacement memory locations is $s_0=02$. Selecting starting memory location $s_0=02$ and setting it equal to a selected memory location $s_n$ at step 67, and continuing with the succeeding steps as described above results in the following sequence of replacement operations:

$$[02] \rightarrow [17] \rightarrow [18] \rightarrow [04] \rightarrow [11] \rightarrow [23] \rightarrow [22] \rightarrow [14] \rightarrow [16] \rightarrow [10] \rightarrow [15] \rightarrow [02].$$

Figure 11:
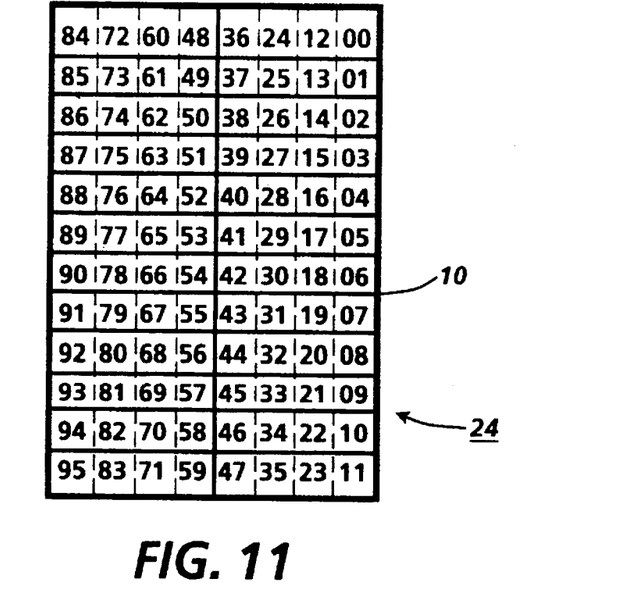
FIG. 11 shows the image in the image buffer in FIG. 5 rotated clockwise by ninety degrees.
Figure 12:
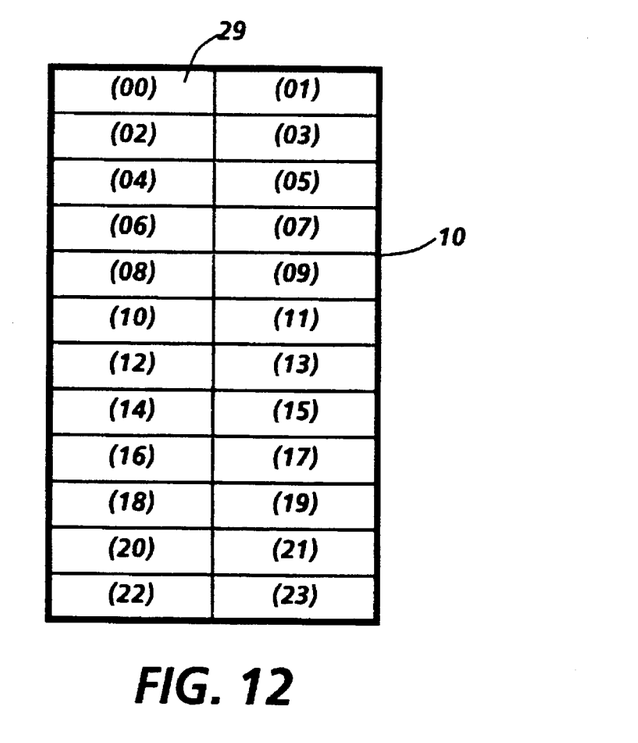
FIG. 12 is the image buffer shown in FIG. 11 diagrammatically representing a matrix of memory words with each memory word having a memory location labeled thereon.

Once a sequence of replacement operations is performed for each memory word forming image buffer 10 except for those memory words that are not replaced such as memory word at memory location $s_n=03$, at step 78, each memory word is ordered to form rotated image 24 in image buffer 10 shown in FIG. 11. Each memory location 29 of the sequence of twenty four memory words of image buffer 10 is defined in FIG. 12. In other words, once every starting memory location in the set of starting memory locations determined has been evaluated at step 78, image buffer 10 in FIG. 11 contains the original image 20 shown in FIG. 4 rotated clockwise by ninety degrees. The rotated image 24 is either stored on hard drive 12, viewed on display 8, rendered on hardcopy by printer 6 or transmitted over network 19 to IOT 18.

Besides simplifying bit operations required to rotate an image by ninety degrees, the present invention first rotates the image by blocks to reduce the number of multiplications and divisions that would be required for rotating a given image only using bit operations. Subsequently, each memory word can be repositioned inside a memory buffer given each memory word is an integer multiple of the dimensions of a block. In processing a subsequent image having dimensions equivalent to digital image 20 stored in data buffer 10, starting memory locations determined at step 60 can be stored in temporary storage buffer 15 to form a set of starting memory locations (e.g. $s_0=00$ and $s_0=02$). Therefore, when processing a subsequent image, at step 60 a set of starting memory location $s_0$ does not need to be determined and is retrieved directly from storage buffer or auxiliary buffer 15.

One method for determining in advance each starting memory location $s_0$ for an image to be rotated by ninety degrees at step 60 is a modified version the flow diagram shown in FIG. 6. First an empty binary image buffer 10 is initialized with zeros, of the size and dimensions of the digital image 20 to be rotated. Starting with memory location $s_n=00$ which is defined as the first starting memory location. Perform steps 67 through 78 such that step 74 is modified so that instead of transferring pixels to the locations $s_n+1$, ones are written in those locations. After finishing a first sequence of replacement operations, each memory location of image buffer 10 is searched in order of increasing memory locations, until finding a memory word which contains zeros. The first pixel which contains all zeros is the next starting memory location $s_0$. This sequence of operations continue until no memory word containing zeros can be found in image buffer 10. The set of starting memory locations determined is then stored in auxiliary buffer 15 which is subsequently used to rotate any number of images.

Also, the set of starting memory locations defined above for rotating an image in place ninety degrees may be used with images having various sizes. Given that an image to be rotated is smaller than the available buffer, the set of starting locations can be used to rotate the image. Thus if an image is somewhat smaller than an image buffer with a known set of starting memory locations, it may be more efficient to fit the image in a corner of the image buffer, as shown in FIG. 2 for example if the image has H' scanlines with each scanline having W pixels. Consequently, the entire buffer is rotated and rearranged to position rotated image scanlines at the top of the buffer. Also, to accommodate many image sizes several sets of starting memory locations can be computed in advance for several different image buffer configurations and stored in a look up table in auxiliary buffer 15.

It will no doubt be appreciated that there are a number of possible variants of the present invention. For instance, when the dimensions of an image and the image buffer are available before the actual image is stored in the image buffer, an initialization routine can be used to identify a set of starting memory locations using the image buffer before the image is stored in the image buffer. The image can subsequently be stored in the image buffer and rotated in accordance with the set of starting memory locations determined previously. Alternatively, with additional buffer space available, a bit array can be defined in auxiliary memory 15 with one bit for each pixel in the case of pixel rotation, or one bit per block word in the case of block rotation. For example, in the case of one bit per pixel images and 32 bit words, the size of the bit array, in bytes, is 1/32 of the image buffer. The bit array is initialized with with all zero bits, and starting locations are determined while performing the sequence of steps to rotate the image as described above and shown in FIG. 6. Thus, using the bit array a set of starting memory locations does not need to be defined a priori at step 60. Starting with $s_0$=00, at step 67, a corresponding bit of the bit array is set to one once a memory word is swapped at step 74. After one sequence of replacement operations is completed, a successive zero bit is search for in the bit array and is selected as a subsequent starting memory location $s_0$ at step 67.

The Appendix is a C code listing of a software implementation for rotating an image clockwise in place of an image buffer, where the image is defined as having only one bit per pixel in accordance with the present invention. The implementation consists of two main procedure calls. The first procedure call "init_rot" is executed before the second "rotate". The first procedure call "init_rot" determines a set of starting memory location. The second procedure call "rotate" rotates an image in accordance with the starting memory locations determined by the "init_rot" procedure call.

The disclosed image processing system may be readily implemented in software using object oriented software development environments that provide portable source code that can be compiled for use on a variety of hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

APPENDIX

```
/*****************************
File: rot90.c
Purpose:  Code for 90 deg. rotation in place of a one bit/pixel image.
******************************/
include <stdio.h> int BL = 32;  /* word size */
int BS = 5;   /* 2**BS = BL */
int BX = 31;  /* BL-1 */
int numind;   /* number of starting points */

/* find the starting points, puts ones in the bitmap. expects a bitmap all zeroes */
init_rot (p,pst,blx,bly,cw)
int *p;   /* pointer to bitmap */
int *pst; /* pointer to array of starting points */
int blx,bly; /* number of blocks in each direction */
int cw;   /* cw = 1 clockwise. cw = 0 counterclockwise rotation */
{
int xx,yy,y,blyy,smax,z,t,s;
int num = 0;

blyy = bly*BL;
smax = blyy*blx;

/* find words which are zero and start the sequence. replace them with ones */
for(z=0; z<smax; z++)
    {  if(p[z] == 1)
            continue;
        pst[num++] = z;
        p[z] = 1;
        yy = z/blx; xx = z -yy*blx;
        for(;;)
          { y = yy >> BS; t = yy & BX;
            /* compute the location in BB and the corresponding location in p[s] */
            if(cw)
               s = ((xx<<BS)+t)*bly + bly-1-y;
            else
               s = (((blx-1-xx)<<BS) + t)*bly + y;
            if(p[s] == 1)
               break;
            p[s] = 1;
            /* the corresponding location in AA */
            yy = s/blx; xx = s-yy*blx;
          }
    }
numind = num;
return(1);
}
```

```
/* rotate all */
rotate (p,pst,blx,bly,cw)
int *p,*pst,blx,bly,cw;
{
/* rotate the blocks */
rotblocks(p,blx,bly,cw);
/* move the words */
move_blocks(p,pst,blx,bly,cw);
}

/* rotate the blocks */
rotblocks (p,blx,bly,cw)
int *p,*lx,bly;
{
int x,y,z0inc;
int z0 = 0;

z0inc = blx << BS;
for(y=0; y<bly;y++)
  {for(x=0; x<blx; x++)
    {/* rotate one block */
    if(cw)
        rot_one_block_CW(p,z0+x,blx);
      else
        rot_one_block_CCW(p,z0+x,blx);
    z0 = z0 + z0inc.
  }
}

/* rotate one block clockwise */
rot_one_block_CW (p,z,blx)
int *p,z,blx;
{
int i,j,s,sh,q,w;
unsigned int in[32];

s=z;
for(j=0;j<=BX;j++)
  { in[j] = p[s];
    s = s + blx;}
for(j=0;j<BL;j++)

{ sh = BX-j; q = 1<<sh;
    w = 0;
    for(i=0;i<BL;i++)
      w = w + (((in[i]&q) >>j)<<i);
    p[z] = w;
    z = z + blx;
  }
}
```

```
/* rotate one block counterclockwise */
rot_one_block_CCW (p,z,blx)
int *p,z,blx;
{
int i,j,s,q,w;
unsigned int in[32];

s = z;
for (j=0; j <= BX; j++)
  {in[j] = p[s];
   s = s + blx;}
for (j=0;j<BL;j++)
 {  q=1<<j;
    w = 0;
    for(i=0; i< BL;i++)
      w = w + (((in[i]&q)>>j)<<(BX-i));
    p[z] = w;
    z = z + blx;
 }
}

/* move the words */
move_blocks (p,pst,blx,bly,cw)
int *p *pst,blx,bly,cw;
{
int k,z,s,xx,yy,y,t,wa,wb;

for(k=0;k<numind;k++)
  {z = pst[k];
   yy = z/blx; xx = z -yy*blx;
   wa = p[z];
   for(;;)
     {y = yy >> BS; t = yy & BX;
      if(cw)
        s = ((xx<<BS) + t)*bly + bly-1-y;
      else
        s = (((blx-1-xx)<<BS) + t)*bly + y;
      wb = p[s]; p[s] = wa; wa = wb; if(s==z)
      break;
      yy = s/blx; xx = s - yy*blx;
     }
  }
}
```

I claim:

1. A method for rotating an image in place while entirely resident in a memory, the image being defined by a rectangular pattern of H lines with each line having W pixels, comprising the steps of:

segmenting the image into square blocks of N pixels per row and N lines per column, said segmenting step storing each line of W pixels defining the image in an array of memory words of an image buffer so that the image is entirely resident in the image buffer;

individually rotating, in place, each N×N square block of pixels in the image buffer segmented by said segmenting step through a selected angle; and subsequent to said segmenting and said rotating steps, performing the steps of:

selecting a memory word of the image buffer as a starting memory location;

copying the memory word at the starting memory location into a memory word of a temporary storage buffer;

determining a replacement memory location $s_{n+1}$ in the image buffer of the memory word in the temporary storage buffer originally stored at memory location $s_n$ in the image buffer;

swapping the memory word in the temporary storage buffer with a memory word at the replacement memory location $s_{n+1}$ in the image buffer;

repeating said steps of determining and swapping until the starting memory location in the image buffer is equivalent to the replacement memory location $s_{n+1}$ in the image buffer for the memory word stored in the temporary storage buffer; and replacing the memory word at the starting memory location in the image buffer with the memory word in the temporary storage buffer, to terminate said repeating step.

2. The method of claim 1, further comprising the step of substituting the starting memory location with a subsequent starting memory location and repeating said steps of copying, determining, swapping, repeating and replacing.

3. The method of claim 2, further comprising the step of performing said substituting step, until each location of every memory word in the image buffer is defined in a sequence of replacement memory locations.

4. The method of claim 3, further comprising the step of recording each starting memory location identified by said selecting step and said substituting step to form a set of starting locations.

5. The method of claim 4, further comprising the step of rotating a subsequent image, being defined by a rectangular pattern of H lines with each line having W pixels, by performing said steps of copying, determining, swapping, repeating and substituting for each starting location in the set of starting locations.

6. The method of claim 4, further comprising the steps of:

determining a plurality of sets of starting memory locations for different image buffer configurations; and storing the plurality of sets of starting memory locations in a look up table.

7. The method of claim 1, wherein said segmenting step comprises the step of storing each row of pixels of each square block in a sequence of memory words of the image buffer.

8. The method of claim 7, wherein said segmenting step comprises the step of copying the sequence of memory words at a starting memory location into a sequence of memory words of the temporary storage buffer.

9. The method of claim 1, wherein said segmenting step stores an image defined by a rectangular pattern of K lines with each line having W pixels, where K is less than H.

10. The method of claim 1, wherein said rotating step comprises the steps of:

representing each square block of N×N pixels segmented by said segmenting step as a two dimensional array $A(x,y)$ of N pixels per row and N pixels per column, each two dimensional array $A(x,y)$ having an x and y component enumerated from zero to $N-1$;

selecting a set of N starting pixels from the two dimensional array $A(x,y)$; and replacing each starting pixel in the set of N starting pixels in accordance with the following sequence of replacement operations:

replace pixel $A(x,y)$ with pixel $A(y, N-1-x)$;

replace pixel $A(y, N-1-x)$ with pixel $A(N-1-y, N-1-x)$;

replace pixel $A(N-1-y, N-1-x)$ with pixel $A(N-1-x, y)$; and replace pixel $A(N-1-x, y)$ with pixel $A(x,y)$.

11. The method of claim 1, wherein said rotating step rotates the image through the selected angle of ninety degrees.

12. An apparatus for rotating an image in place while entirely resident in a memory, the image being defined by a rectangular pattern of H lines with each line having W pixels, comprising:

an image buffer being defined by an array of memory words;

means for segmenting the image into square blocks of N pixels per row and N lines per column, said segmenting means storing each line of W pixels of the image in the array of memory words of said image buffer;

means for individually rotating, in place, each N×N square block of pixels in said image buffer segmented by said segmenting means through a selected angle;

means for selecting a memory word of the image buffer as a starting memory location;

an auxiliary storage buffer having at least one memory word;

means for copying the memory word at the starting memory location into a memory word of said auxiliary storage buffer originally stored at memory location $s_n$ in said image buffer;

a processor for determining a replacement memory location $s_{n+1}$ in said image buffer of the memory word stored in said auxiliary storage buffer;

means for swapping the memory word in said auxiliary storage buffer with a memory word at the replacement memory location $s_{n+1}$ in said image buffer;

means for defining a sequence of replacement memory locations with said processor and said swapping means that terminates in response to the starting memory location in said image buffer being determined to be a replacement memory location $s_{n+1}$ in said image buffer for the memory word in said auxiliary storage buffer; and means for replacing the memory word at the starting memory location in said image buffer with the memory word in said auxiliary storage buffer to terminate the sequence of replacement memory locations.

13. The apparatus of claim 12, wherein the selected angle is ninety degrees.

* * * * *